R. DUTTON.
Mower.
No. { 120 / 1,224. }
Reissued Aug. 27. 1861.
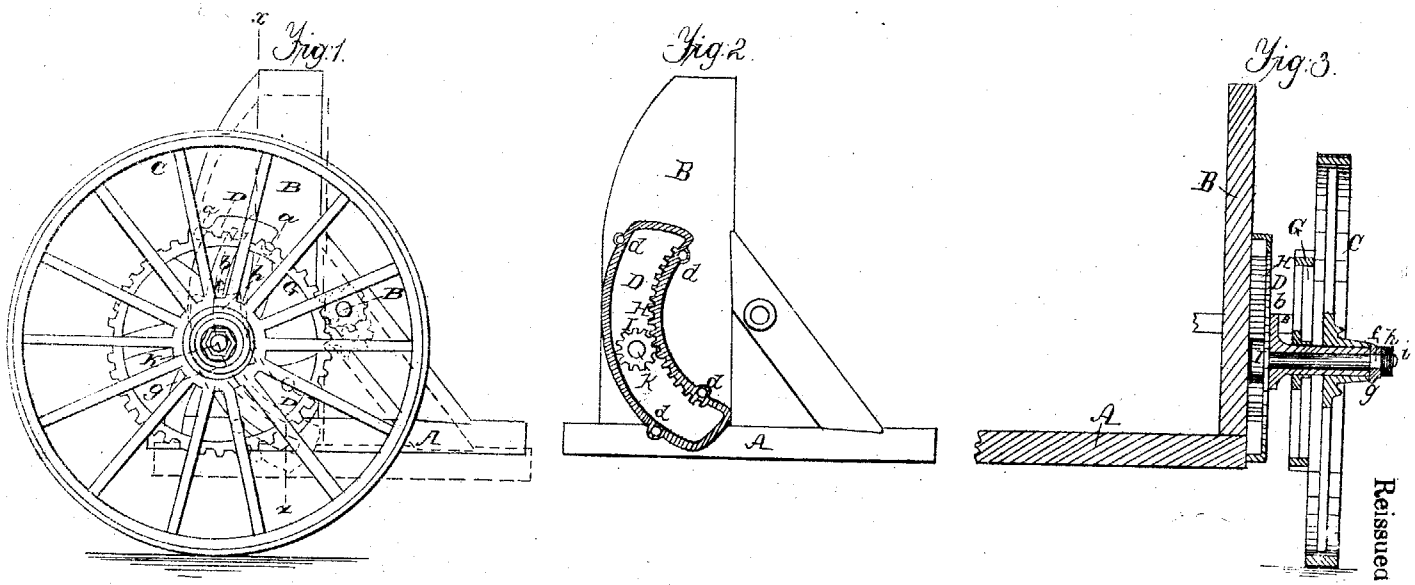
Witnesses,
J. L. Brown
Hiram H. Brown
Rufus Dutton
By H. F. Ogden
Atty.

UNITED STATES PATENT OFFICE.

RUFUS DUTTON, OF DAYTON, OHIO.

IMPROVEMENT IN HARVESTERS.

Specification forming part of Letters Patent No. 20,050, dated April 27, 1858; Reissue No. 1,224, dated August 27, 1861.

*To all whom it may concern:*

Be it known that I, RUFUS DUTTON, of Dayton, in the county of Montgomery and State of Ohio, have invented certain new and useful Improvements in Harvesters; and I do hereby declare that the following is a full and exact description thereof, reference being had to the accompanying drawings, making part of this specification.

Figure 1 is a side elevation of a portion of a harvester with my improvements applied thereto; Fig. 2, a similar elevation showing the slotted plate hereinafter described in section; Fig. 3, a transverse vertical section of the same, the line of section being indicated by *x x*, Fig. 1.

Like letters designate corresponding parts in all the figures.

The design of my improvements is to render the platforms of harvesters adjustable to greater or less heights from the ground, as may be necessary or desirable, to adapt the machine to the work.

The invention principally consists in the use of a rack concentric with the actuating-pinion of the counter-shaft and secured immediately to the platform-frame, in combination with a pinion secured directly to the inner end of the axle of the main driving-wheel, whereby the platform is adjusted to and sustained at any desirable height by raising it with one hand, while at the same time the main gear-wheel and actuating-pinion of the counter-shaft are perfectly meshed at all positions; and the invention further consists in the arrangement and combination of parts hereinafter fully described.

The platform A of the harvester may be of ordinary form and construction, to which may be secured, in any desirable way, a standard or post, B, (forming a part of the frame,) for connecting the driving-wheel C thereto that sustains and actuates the machine.

To the side of the standard is secured, by means of screws *a a*, or in any other convenient manner, a rack-plate, D, of suitable size for the purpose designed, made in the form of a segment of a circle concentric with the axis of the actuating-pinion E, (driving the working parts,) which receives its motion from the main cog-wheel G, secured to the driving-wheel. This plate is provided with a concentric slot, *b*, in its face, (Figs. 1 and 3,) extending nearly its whole length; and it has within and on one side of the slot a concentric rack, H, as represented, into which gears a pinion, I, rigidly secured to a shaft, K, projecting out through the slot in the plate a sufficient distance, and forming the axle of the driving-wheel. When the pinion I is operated, it being meshed with the rack H causes the plate D to turn round the axle K, (which acts as a lever,) and consequently adjusts the platform A to any desired position, high or low. Then by securing said axle rigidly, so as not to turn back, the platform is sustained in that position.

The object of making the rack H concentric with the actuating-pinion E of the counter-shaft is to always keep said pinion in gear with the main gear-wheel G when the platform is adjusted up and down.

Thus, by the use of the rack and pinion connected, respectively, with the platform and the driving-wheel, I am enabled to raise said platform either by taking hold of it direct by one hand or by turning the axle K with one hand, while the other hand is free to secure said axle in a rigid position by a suitable means for the purpose. One person can easily adjust and secure the platform in this manner in a few moments, while in all other devices with which I am acquainted it requires two or more persons to accomplish the same result. When the pinion I is once rigidly secured by being engaged with the rack H, the platform is held and sustained firmly and without the possibility of its being disarranged, while at the same time the adjustment of said platform to any position, higher or lower, does not interfere in the least with the perfect action of the main gear-wheel G and actuating-pinion E, as they are always perfectly geared. The axle K rests closely but loosely in a hollow sleeve or bore, L, forming a tube or cylinder of sufficient length for the purpose designed, as represented most clearly in Fig. 3. The inner end of this hollow sleeve is formed into a face, *c*, of suitable size to give a bearing against the face of the plate D, which it fits. The face *c* is provided with one or more projections *d*, which fit closely and slide in the slot *b* of the plate and serve as a guide when said plate is raised and lowered, and also to prevent the hollow sleeve from turning when the axle within it is turned. This sleeve being thus of cylindrical shape, serves for the bearing on which rests and turns the hub of the driving-wheel, and also as one part of the arrangement whereby the pinion I and plate D are clamped together when the platform is properly adjusted. By the use of this hollow sleeve I am enabled to operate the other parts without hinderance from the driving-wheel, and at any time when it becomes worn or out of order it can be replaced at trifling cost and without trouble, and the shaft or axle it incloses is prevented from wear and shielded from injury.

On the extreme outer end of the axle K is cut a screw-thread, *i*, Fig. 3, and intermediate with this screw-thread and the outer end of the hollow sleeve or bore L (which is somewhat shorter than the axle) said axle is made square in transverse section, as represented at *f*. On this square portion of the axle, and against the end of the sleeve, fits a jam-washer, *g*, of sufficient size to keep the driving-wheel in place, and on the screw end *i* of the axle fits a nut, *h*, as represented.

When it is desired to adjust the platform—as, for instance, from the position shown in red lines to the position shown in black lines in Fig. 1—the nut *h* at the end of the axle is unscrewed so as to allow said axle to turn freely. The platform is then raised to the required height by lifting it by one hand, or by fitting a wrench to the jam-washer *g* and turning the axle K with its pinion I. When this is done, the nut *h* is screwed up again against the jam-washer, thereby drawing the pinion I firmly against the inside of the face of the plate D, while at the same time its pressure against the jam-washer pushes the face *c* of the hollow sleeve firmly against the outside of the face of the plate D. Thus the pinion and plate are firmly and securely locked together, and the service of but one person is required to perform the whole operation of adjusting the platform.

What I claim as my invention, and desire to secure by Letters Patent, is—

1. The concentric rack H, in combination with the pinion I, when the same are respectively secured directly with the platform-frame and the axle of the main driving-wheel of a harvester, without intermediate parts, and so that by merely raising the platform with one hand the adjustment is accomplished, while at the same time the gear-wheel and actuating-pinion are perfectly meshed at any position, substantially as herein set forth.

2. The hollow sleeve or bore L, inclosing the axle K, and forming the bearing of the hub of the driving-wheel, when said sleeve is provided with the face *c*, and projection or projections *d*, resting in the slot *b* of the plate, substantially as described.

3. In combination with the sleeve L and the the axle K with its pinion I the jam-washer *g*, and nut *h*, for clamping the pinion with the plate, substantially as herein specified.

In witness whereof I hereunto set my hand this 10th day of May, 1861.

RUFUS DUTTON.

Witnesses:

WM. J. COMLY,
O. R. HERSEY.